United States Patent
Mylavaram et al.

(10) Patent No.: US 12,248,813 B2
(45) Date of Patent: Mar. 11, 2025

(54) SYSTEM AND METHOD FOR PERFORMING DYNAMIC EXECUTION OF DATA PROCESSES IN DISTRIBUTED SERVER SYSTEMS

(71) Applicant: BANK OF AMERICA CORPORATION, Charlotte, NC (US)

(72) Inventors: Mohan Krishna Mylavaram, Telangana (IN); Raja Arumugam Maharaja, Tamil Nadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 495 days.

(21) Appl. No.: 17/673,125

(22) Filed: Feb. 16, 2022

(65) Prior Publication Data

US 2023/0259398 A1 Aug. 17, 2023

(51) Int. Cl.
G06F 9/50 (2006.01)
G06F 9/48 (2006.01)
G06F 11/30 (2006.01)
G06F 11/34 (2006.01)

(52) U.S. Cl.
CPC .......... G06F 9/5027 (2013.01); G06F 9/4881 (2013.01); G06F 11/3006 (2013.01); G06F 11/3409 (2013.01)

(58) Field of Classification Search
CPC .. G06F 9/5027; G06F 9/4881; G06F 11/3006; G06F 11/3409
See application file for complete search history.

(56) References Cited

U.S. PATENT DOCUMENTS

| | | | |
|---|---|---|---|
| 6,411,967 B1 | 6/2002 | Van Renesse | |
| 6,529,953 B1 | 3/2003 | Van Renesse | |
| 8,433,760 B2 | 4/2013 | Ganapathy et al. | |
| 10,362,106 B2 | 7/2019 | Kumar et al. | |
| 2009/0089419 A1* | 4/2009 | Saha | H04L 41/0681 709/224 |
| 2012/0173709 A1* | 7/2012 | Li | G06F 9/5011 709/224 |
| 2014/0033180 A1* | 1/2014 | Bates | G06F 11/3636 717/129 |

(Continued)

FOREIGN PATENT DOCUMENTS

| | | | |
|---|---|---|---|
| CN | 106656624 A | 5/2017 | |
| CN | 111866076 A | 10/2020 | |

*Primary Examiner* — Tuan C Dao
(74) *Attorney, Agent, or Firm* — Moore & Van Allen PLLC; Anoohya Yarlagadda

(57) ABSTRACT

Embodiments of the invention provide a system for performing dynamic execution of data processes in distributed server systems. The system is configured for identifying initiation of at least one data process that is scheduled to be executed on at least one server of distributed server systems associated with an entity, communicating with a metrics node comprising a metrics machine learning model to gather information associated with the at least one server, determining that the at least one server will experience degradation of performance while performing at least one step of the at least one data process based on communicating with the metrics node, and routing the at least one step of the at least one data process to at least one new server and execute the at least one step on the at least one new server.

20 Claims, 5 Drawing Sheets

(56) References Cited

U.S. PATENT DOCUMENTS

| | | | | |
|---|---|---|---|---|
| 2015/0019478 | A1* | 1/2015 | Buehne | G06F 16/119 |
| | | | | 707/609 |
| 2016/0337510 | A1* | 11/2016 | Li, I | G10L 25/60 |
| 2017/0236372 | A1* | 8/2017 | Bulzacki | G07F 17/3225 |
| | | | | 463/43 |
| 2018/0349178 | A1* | 12/2018 | Painter | G06F 9/5083 |
| 2019/0028347 | A1* | 1/2019 | Johnston | H04L 43/20 |
| 2019/0149399 | A1* | 5/2019 | Reed | H04L 41/0895 |
| | | | | 709/223 |
| 2020/0076812 | A1* | 3/2020 | Spurlock | G06N 20/00 |
| 2021/0103654 | A1* | 4/2021 | Putman | G06N 3/063 |
| 2021/0201091 | A1* | 7/2021 | Yadav | G06V 10/87 |
| 2021/0383289 | A1* | 12/2021 | Dmitriev | G06F 9/3555 |
| 2021/0383330 | A1* | 12/2021 | Currie | G06N 3/063 |

\* cited by examiner

SYSTEM AND METHOD FOR PERFORMING DYNAMIC EXECUTION OF DATA PROCESSES IN DISTRIBUTED SERVER SYSTEMS

BACKGROUND

Conventional systems do not have the ability to dynamically route and execute data processes on multiple server systems. As such, there exists a need for a system to efficiently and dynamically route and execute data processes on multiple server systems.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for performing dynamic execution of data processes in distributed server systems. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention identifies initiation of at least one data process that is scheduled to be executed on at least one server of distributed server systems associated with an entity, onboards a machine learning model onto the at least one server to monitor execution of the at least one data process on the at least one server, wherein the machine learning model monitors execution of the at least one data process, communicates with a metrics node comprising a metrics machine learning model to gather information associated with the at least one server, wherein the metrics node monitors performance of the distributed server systems comprising the at least one server, via the metrics machine learning model, wherein the metrics node communicates with the machine learning model onboarded onto the at least one server to monitor execution of the at least one data process, determines that the at least one server will experience degradation of performance while performing at least one step of the at least one data process based on communicating with the metrics node, and routes the at least one step of the at least one data process to at least one new server and execute the at least one step on the at least one new server.

In some embodiments, the present invention dynamically creates the at least one new server based on determining that at least one server will experience degradation of performance while performing the at least one step of the at least one data process.

In some embodiments, the present invention dynamically creates the at least one new server based on identifying that a first server of the distributed server systems has processing capability to execute the at least one step associated with the at least one data process based on communicating with the metrics machine learning model of the metrics node, identifies one or more characteristics of the first server; and dynamically replicating the one or more characteristics of the first server to create the at least one new server to execute the at least one step of the at least one data process.

In some embodiments, the present invention determines that the at least one new server has completed execution of the at least one step and terminates the at least one new server based on determining that the at least one new server has completed execution of the at least one step.

In some embodiments, the present invention determines that the at least one new server has completed execution of the at least one step, determines that at least one other step associated with at least one other data process scheduled to be executed on any server of the distributed server systems needs additional processing capability for successful execution, wherein the at least one other steps associated with the at least one other data process has same requirements as the at least one step associated with the at least one data process, and routes the at least one other step associated with the at least one other data process to the at least one new server and execute the at least one other step on the at least one new server.

In some embodiments, the present invention determines that execution of the at least one other step on the at least one new server is complete, determines that no other tasks require processing capability of the at least one new server, and terminates the at least one new server.

In some embodiments, the present invention in response to executing the at least one step of the at least one data process in the at least one new server, resumes execution of remaining steps associated with the at least one data process on the at least one server.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
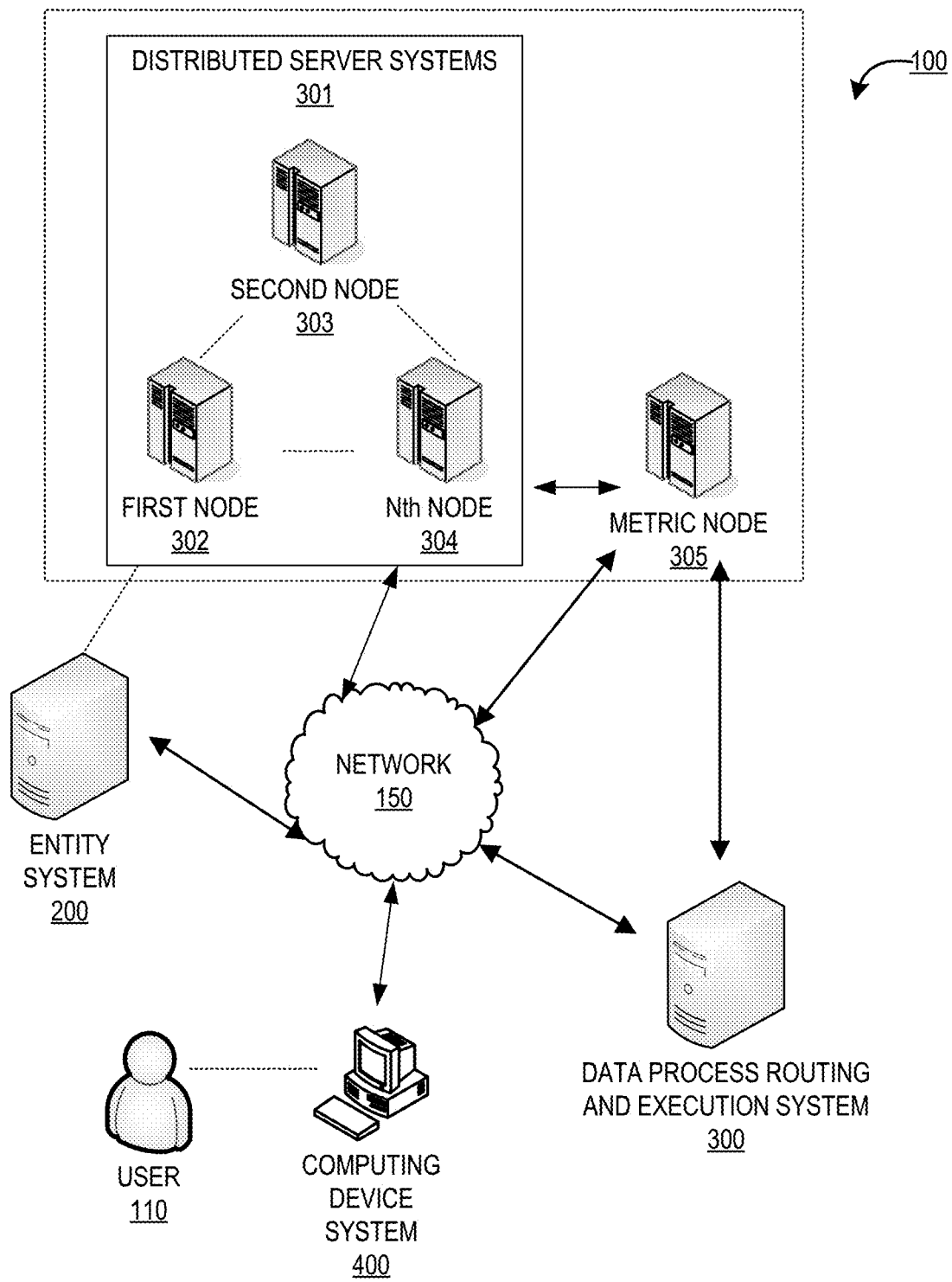
Figure 2:
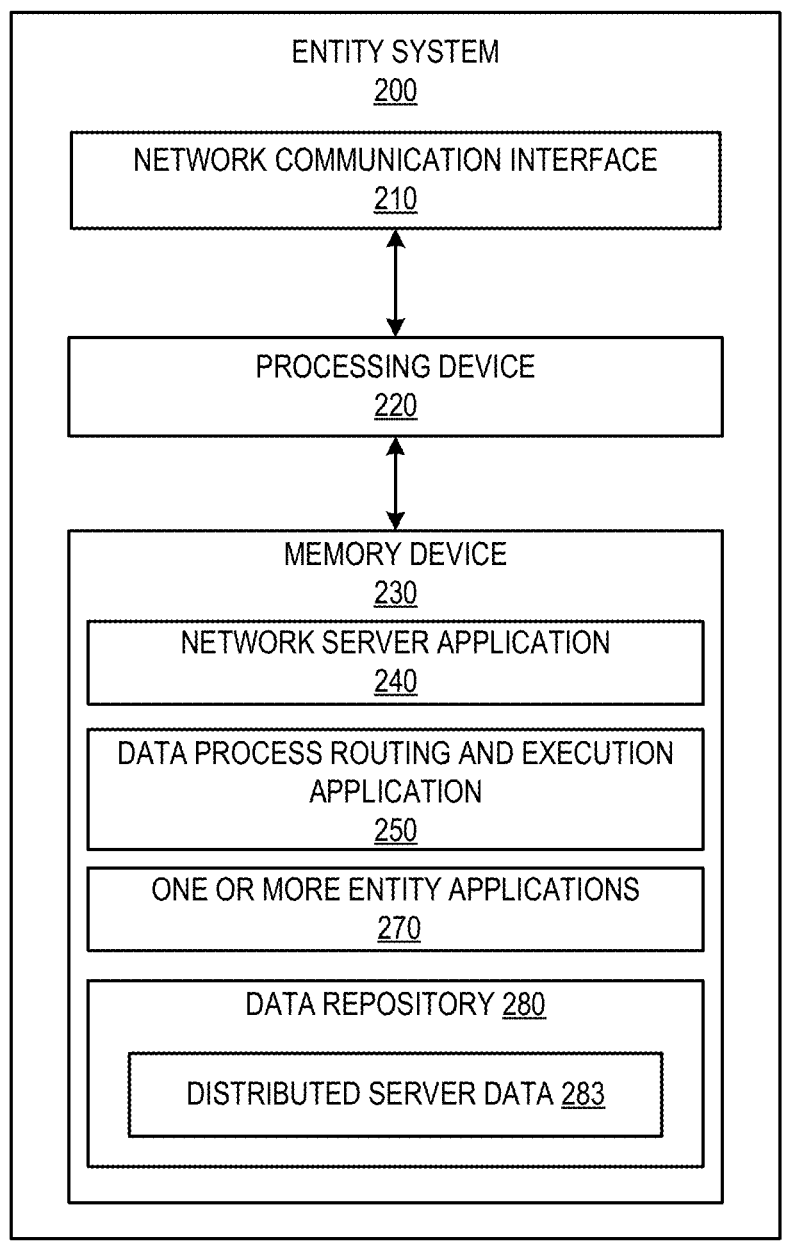
Figure 3:
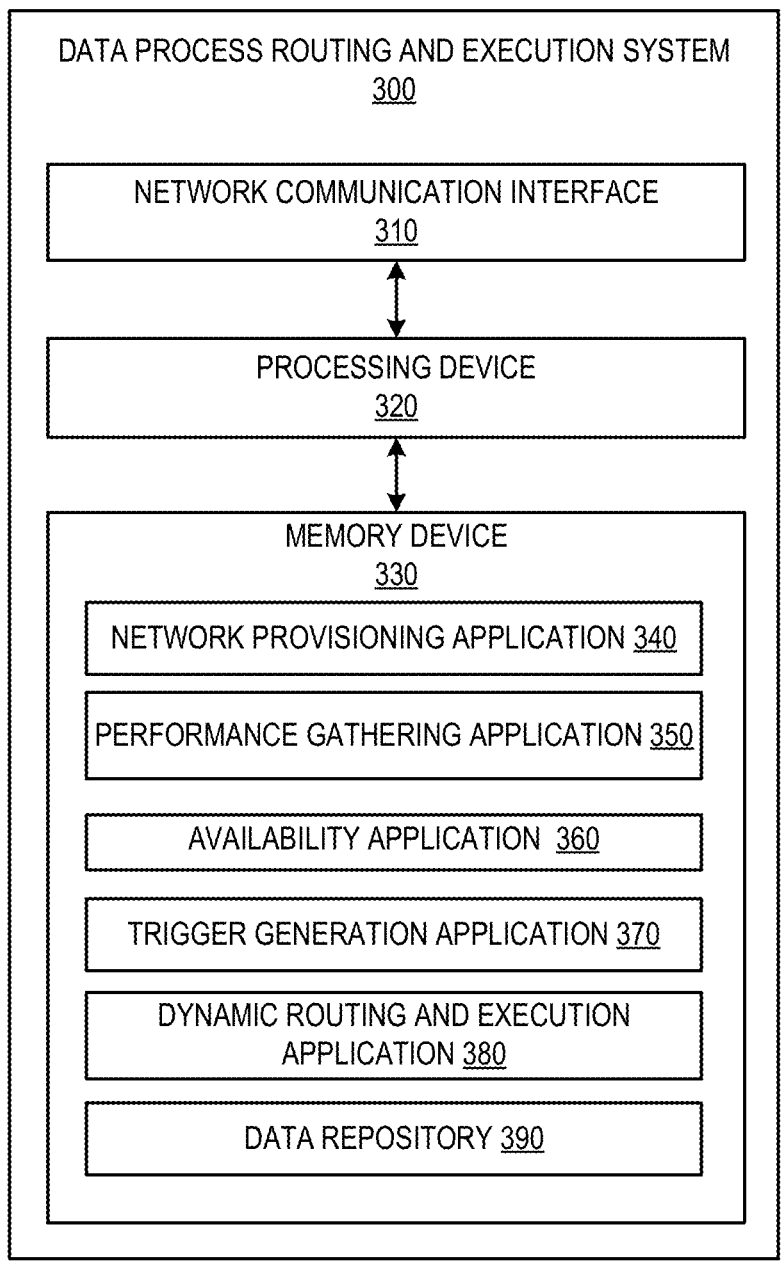
Figure 4:
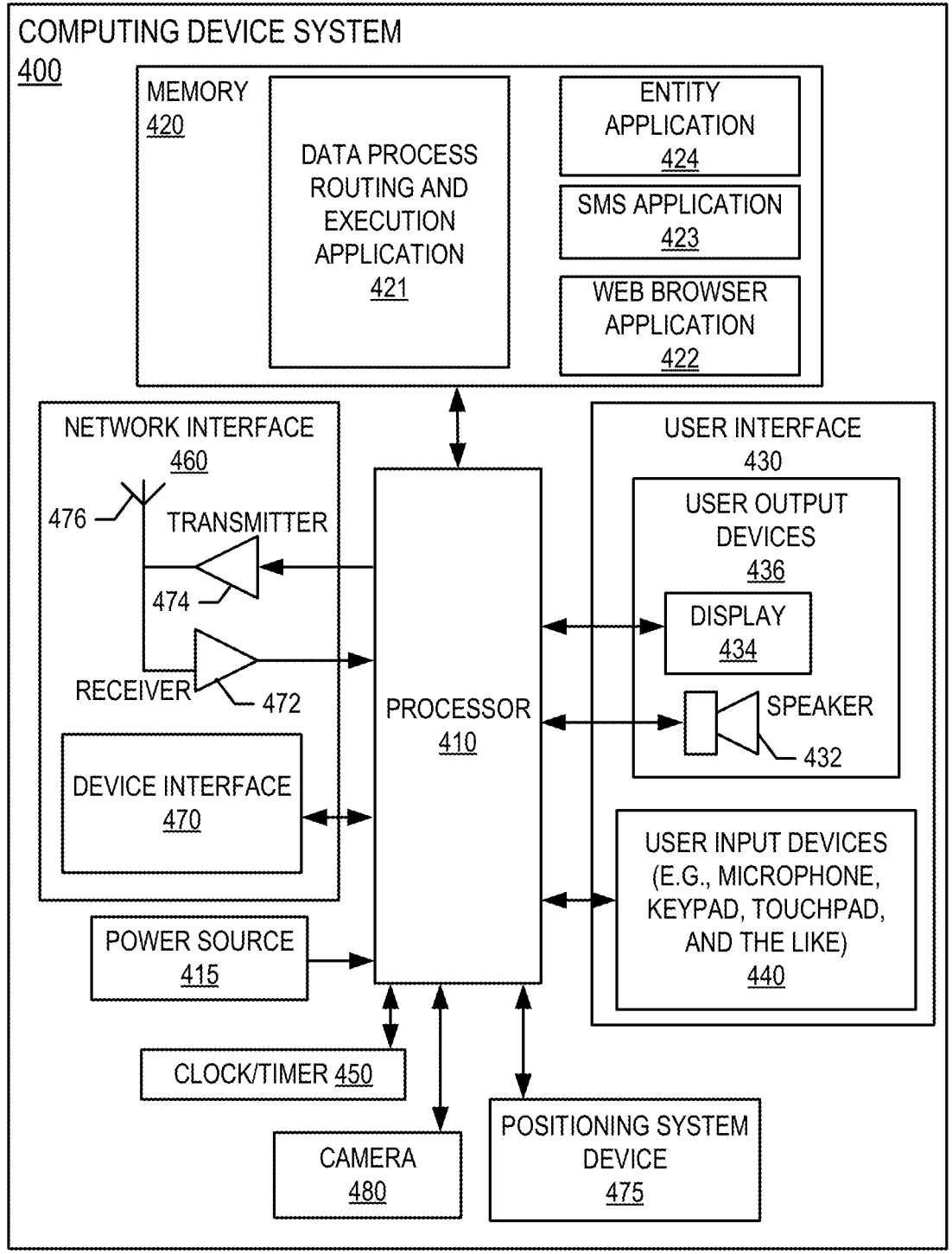
Figure 5:
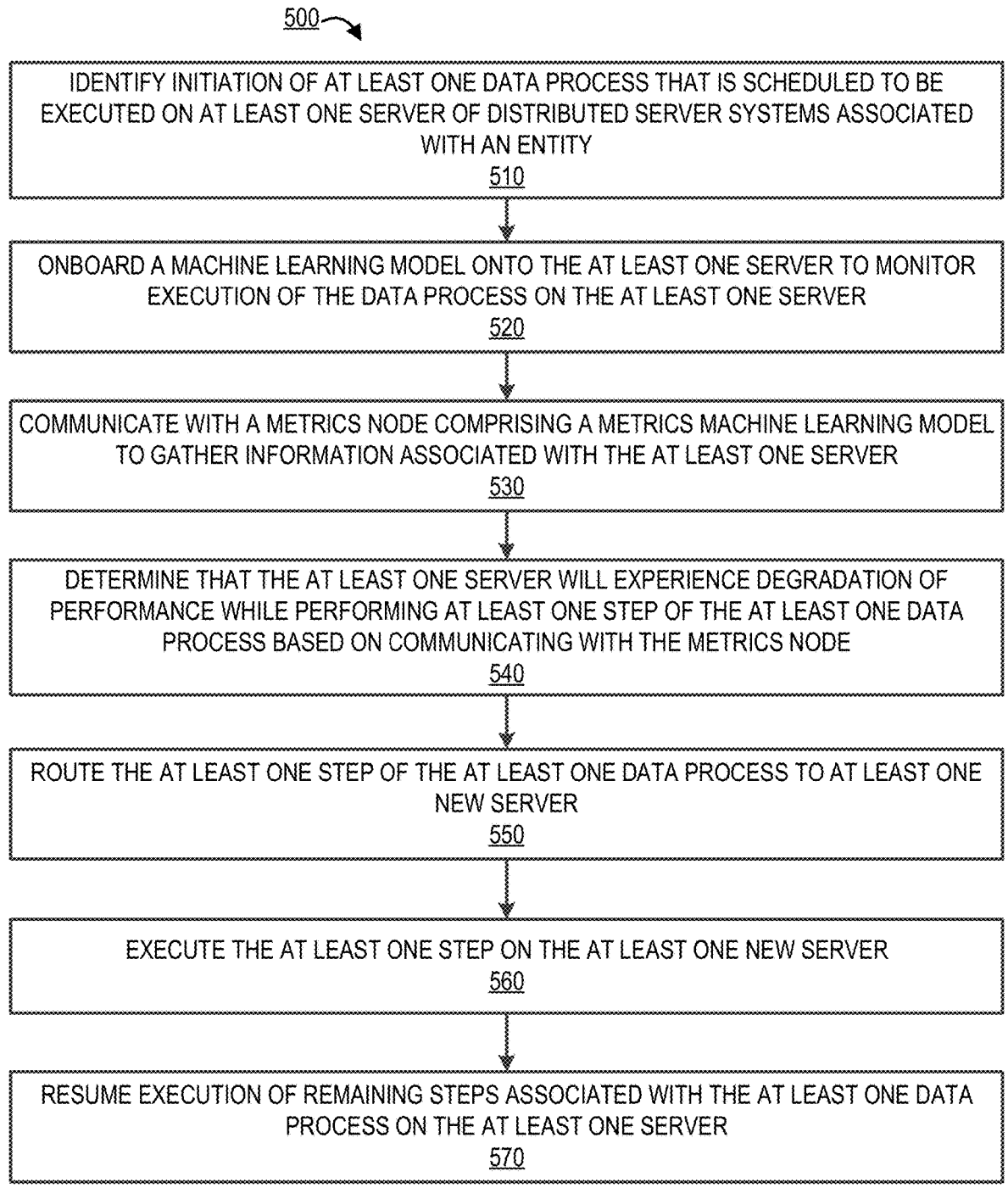

Having thus described embodiments of the invention in general terms, reference will now be made the accompanying drawings, wherein:

FIG. 1 provides a block diagram illustrating a system environment for performing dynamic execution of data processes in distributed server systems, in accordance with an embodiment of the invention;

FIG. 2 provides a block diagram illustrating the entity system 200 of FIG. 1, in accordance with an embodiment of the invention;

FIG. 3 provides a block diagram illustrating a data process routing and execution system 300 of FIG. 1, in accordance with an embodiment of the invention;

FIG. 4 provides a block diagram illustrating the computing device system 400 of FIG. 1, in accordance with an embodiment of the invention; and FIG. 5 provides a flowchart illustrating a process flow for performing dynamic execution of data processes in distributed server systems, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "entity" may include any organization that uses one or more applications or one or more data processes to perform one or more organizational activities. In some embodiments, entity may be any organization that processes financial transactions including, but not limited to, banks, credit unions, savings and loan associations, investment companies, stock brokerages, insurance companies and the like.

Many of the example embodiments and implementations described herein contemplate interactions engaged in by a user with a computing device and/or one or more communication devices and/or secondary communication devices. Furthermore, as used herein, the term "user computing device" or "mobile device" may refer to mobile phones, computing devices, tablet computers, wearable devices, smart devices and/or any portable electronic device capable of receiving and/or storing data therein. In some embodiments, user may be an employee of the entity.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

A "system environment", as used herein, may refer to any information technology platform of an enterprise (e.g., a national or multi-national corporation) and may include a multitude of servers, machines, mainframes, personal computers, network devices, front and back end systems, database system and/or the like.

"Distributed servers" or "distributed server systems" as used herein may be any clusters, systems, servers, or the like associated with the entity that are configured to execute and/or process one or more data processes associated with the entity, where the one or more data processes may be associated with organization activities associated with the entity. "Node" as used herein may refer to a computing system/server that is a part of the distributed server systems.

Typically, one or more organization activities of an entity are assigned to be executed on a group of servers, where each of the one or more organizational activities may comprise one or more data processes. However, such static execution of the one or more data processes on the group of servers may cause one or more data processes to fail due to inadequate processing power provided by the group of servers. In such instances, even if one step of the one or more data processes fails, the execution of the one or more data processes has to be initiated right from the start, thereby resulting in wasteful consumption of processing power and memory. As such, there exists a need for a system that dynamically routes and executes the one or more data processes on distributed server systems. The system of the present invention solves the above problem as discussed in detail below.

FIG. 1 provides a block diagram illustrating a system environment 100 for performing dynamic execution of data processes in distributed server systems, in accordance with an embodiment of the invention. As illustrated in FIG. 1, the environment 100 includes a data process routing and execution system 300, an entity system 200, distributed server systems 301, a metrics node 305, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees, contractors, sub-contractors, or the like of an entity associated with the entity system 200.

The entity system(s) 200 may be any system owned or otherwise controlled by an entity to support or perform one or more process steps described herein. In some embodiments, the managing entity is a financial institution. In some embodiments, the entity system 200 may include one or more servers and represented as distributed server systems 301. In some embodiments, the distributed server systems 301 comprises one or more nodes (e.g., first node 302, second node 303, through nth node 304). In some embodiments, the distributed server systems 301 may be a part of a distributed ledger network. A distributed ledger network may be a group of servers, systems, or the like that are run without a centralized server, unlike a distributed register network such as a blockchain network. Each "node" stores its own ledger on its own computing system/server and allows users to make changes/actions without having to submit requests to a global validator network for consensus. In some embodiments, each of the one or more nodes of the distributed server systems 301 comprise a machine learning model that performs analysis associated with the performance of the one or more nodes, where the machine learning models are provided by the data process routing and execution system 300. In some embodiments, the data process routing and execution system 300 onboards the machine learning models onto the one or more nodes of the distributed server systems 301 after a data process/task is assigned or configured to be run on the one or more nodes of the distributed server systems 301 to monitor how the one or more nodes are handling the execution of the data process/task.

The data process routing and execution system 300 is a system of the present invention for performing one or more process steps described herein. In some embodiments, the data process routing and execution system 300 may be an independent system. In some embodiments, the data process routing and execution system 300 may be a part of the entity system 200. In some embodiments, the metrics node 305 may be a part of the data process routing and execution system 300. In some embodiments, the metrics node 305 may be a part of the distributed server system 301. In some embodiments, the metrics node 305 may be operated, controlled, maintained, and/or managed by the data process routing and execution system 300. In some embodiments, the metrics node 305 may be a part of a distributed ledger network. In some such embodiments, the distributed ledger network associated with metrics node 305 may be different from the distributed ledger network associated with the distributed server systems 301. In some embodiments, the metrics node 305 may further comprise at least three sub-nodes, where each of the sub-nodes (may be referred to as gossip nodes) constantly communicate each other about information associated with one or more nodes of the distributed server systems 301. In one exemplary embodiment, a first sub-node of the three sub-nodes will communicate with each of the one or more nodes to gather information associated the performance, current processing capabilities, or the like of the one or more nodes of the distributed server systems 301, a second sub-node communicates with the first sub-node to extract information about any of the one or more nodes of the distributed server systems 301, performs analysis via a machine learning model provided by the data process routing and execution system 300, and passes it on to a third sub-node, where the third sub-node notifies an end user or the data process routing and execution system 300, where the data process routing and execution system 300 utilizes this information provided by the third sub-node to dynamically route and execute one or more data processes as explained in FIG. 5. In some embodiments, the machine learning model present in the second sub-node may be monitored, managed, controlled, and/or operated by the data process routing and execution system 300.

The data process routing and execution system 300, the entity system 200, and/or the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the data process routing and execution system 300 is configured to communicate information or instructions with the entity system 200, and/or the computing device system 400 across the network 150.

The computing device system 400 may be a system owned or controlled by the entity of the entity system 200, and/or the user 110. As such, the computing device system 400 may be a computing device of the user 110. In general, the computing device system 400 communicates with the user 110 via a user interface of the computing device system 400, and in turn is configured to communicate information or instructions with the data process routing and execution system 300, and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a data process routing and execution application 250, one or more entity applications 270, and a data repository 280 comprising distributed server data 283. The computer-executable program code of the network server application 240, the data process routing and execution application 250, the one or more entity applications 270, to perform certain logic, data-extraction, and data-storing functions of the entity system 200 described herein, as well as communication functions of the entity system 200.

The network server application 240, the data process routing and execution application 250, the one or more entity applications 270, are configured to store data in the data repository 280 or to use the data stored in the data repository 280 when communicating through the network communication interface 210 with the data process routing and execution system 300, and/or the computing device system 400 to perform one or more process steps described herein. In some embodiments, the entity system 200 may receive instructions from the data process routing and execution system 300 via the data process routing and execution application 250 to perform certain operations. The data process routing and execution application 250 may be provided by the data process routing and execution system 300. The one or more entity applications 270 may be any of the applications used, created, modified, and/or managed by the entity system 200. In one embodiment, an entity application may be an online banking application provided to the one or more users 110.

FIG. 3 provides a block diagram illustrating the data process routing and execution system 300 in greater detail, in accordance with embodiments of the invention. As illustrated in FIG. 3, in one embodiment of the invention, the data process routing and execution system 300 includes one or more processing devices 320 operatively coupled to a network communication interface 310 and a memory device 330. In certain embodiments, the data process routing and execution system 300 is operated by a first entity, such as a financial institution. In some embodiments, the data process routing and execution system 300 is owned or operated by the entity of the entity system 200. In some embodiments, the data process routing and execution system 300 may be an independent system. In alternate embodiments, the data process routing and execution system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the data process routing and execution system 300 described herein. For example, in one embodiment of the data process routing and execution system 300, the memory device 330 includes, but is not limited to, a network provisioning application 340, a performance gathering application 350, an availability application 360, a trigger generation application 370, a dynamic routing and execution application 380, and a data repository 390 comprising data processed or accessed by one or more applications in the memory device 330. The computer-executable program code of the network provisioning application 340, the performance gathering application 350, the availability application 360, the trigger generation application 370, and the dynamic routing and execution application 380 may instruct the processing device 320 to perform certain logic, data-processing, and data-storing functions of the data process routing and execution system 300 described herein, as well as communication functions of the data process routing and execution system 300.

The network provisioning application 340, the performance gathering application 350, the availability application 360, the trigger generation application 370, and the dynamic routing and execution application 380 are configured to invoke or use the data in the data repository 390 when communicating through the network communication interface 310 with the entity system 200, and/or the computing device system 400. In some embodiments, the network provisioning application 340, the performance gathering application 350, the availability application 360, the trigger generation application 370, and the dynamic routing and execution application 380 may store the data extracted or received from the entity system 200, and the computing device system 400 in the data repository 390. In some embodiments, the network provisioning application 340, the performance gathering application 350, the availability application 360, the trigger generation application 370, and the dynamic routing and execution application 380 may be a part of a single application.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a data process routing and execution application 421, entity application 424. These applications also typically instructions to a graphical user interface (GUI) on the display 430 that allows the user 110 to interact with the entity system 200, the data process routing and execution system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the data process routing and execution application 421 provided by the data process routing and execution system 300 allows the user 110 to access the data process routing and execution system 300. In some embodiments, the entity application 424 provided by the entity system 200. In some embodiments, the entity application 424 may be an online banking application. In some embodiments, the data process routing and execution application 421 allow the user 110 to access the functionalities provided by the data process routing and execution system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a flowchart illustrating a process flow for performing dynamic execution of data processes in distributed server systems, in accordance with an embodiment of the invention.

As shown in block 510, the system identifies initiation of at least one data process that is scheduled to be executed on at least one server of distributed server systems associated with an entity. In some embodiments, a user from a first team may initiate execution of the at least one data process on the at least one server. In some embodiments, an application may initiate the execution of the at least one data process on the at least server.

As shown in block 520, the system onboards a machine learning model onto the at least one server to monitor execution of the data process on the at least one server. In response to identifying initiation of execution of the at least one data process on the at least one server, the system onboards a machine learning model that monitors the execution of the at least one data process on the at least one server. Monitoring the execution of the at least one data process comprises monitoring usage of memory, processing power, or the like provided by the at least one server. In some embodiments, the machine learning model is trained on historical data by the system to determine one or more steps associated with the at least one data process, time and processing power required for execution of each of the one or more steps, dependencies associated with the one or more steps, or the like.

As shown in block 530, the system communicates with a metrics node comprising a metrics machine learning model to gather information associated with the at least one server. The metrics node may comprise a metrics machine learning model provided by the system of the invention that monitors performance of one or more servers in the distributed server systems including the at least one server. The metrics machine learning model may communicate with each of the machine learning models in the one or more servers of the distributed server systems to gather information associated with the one or more servers (e.g., scheduled data processes, available processing power and memory, or the like). In some embodiments, the machine learning models in the one or more servers of the distributed server systems may predict any upcoming issues with one or more data processes that are initiated on the one or more servers or scheduled to be initiated on the one or more servers.

As shown in block 540, the system determines that the at least one server will experience degradation of performance while performing at least one step of the at least one data process based on communicating with the metrics node. The machine learning model in the at least one server may communicate with the metrics machine learning model that the at least one step of the at least one data process will degrade the performance of the at least one server and may likely cause the execution of the at least one step to fail. In response to determining degradation of the performance, the metrics machine learning model based on data gathered from machine leaning models from all other servers of the distributed server systems, determines that a first server of the distributed server system has the capability (e.g., enough processing power, or the like) to execute the at least one step.

Based on determining of the availability of the first server, the system identifies one or more characteristics of the first server, replicates the one or more characteristics of the first server to create at least one new server to execute the at least one step. In some embodiments, instead of creating the at least one new server, the system may dynamically create a new session on the first server for the execution of the at least one step. In some embodiments, the system may cause the at least one server to solve a hashing algorithm associated with the first server in order to gain access to the one or more characteristics of the first server. Upon successful solving of the hashing algorithm, the first server may allow the system and/or the at least one server to replicate the first server or create a new session on the first server to execute the at least one step. In some embodiments, the system may automatically solve the hashing algorithm of the first server. As shown in block 550, the system routes the at least one step of the at least one data process to at least one new server. As shown in block 560, the system executes the at least one step on the at least one new server.

In some embodiments, the system determines that the at least one new server has completed execution of the at least one step and terminates the at least one new server based on determining that the at least one new server has completed execution of the at least one step.

In some embodiments, the system determines that the at least one new server has completed execution of the at least one step, determines that at least one other step associated with at least one other data process scheduled to be executed on any server of the distributed server systems needs additional processing capability for successful execution, wherein the at least one other steps associated with the at least one other data process has same requirements as the at least one step associated with the at least one data process, and routes the at least one other step associated with the at least one other data process to the at least one new server and execute the at least one other step on the at least one new server. For example, the system may determine that another user of the same team as that of the user who initiated the execution of the at least one data process, has initiated a second data process, where the second data process comprises a second step that requires the same processing power and memory as that of the at least one step and may execute the second step on the at least one new server created by the system. Before terminating the at least one new server, the system determines that no other tasks require processing capability of the at least one new server and then proceeds to terminating the at least one new server.

As shown in block 570, the system resumes execution of remaining steps associated with the at least one data process on the at least one server. For example, if a fourth step of the at least one data process was routed to be executed on the at least one new server, the system resumes execution of a fifth step of the at least one process on the at least one server.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for performing dynamic execution of data processes in distributed server systems, the system comprising:
    at least one network communication interface;
    at least one non-transitory storage device; and
    at least one processing device coupled to the at least one non-transitory storage device and the at least one network communication interface, wherein the at least one processing device is configured to:
    identify initiation of at least one data process to be executed on at least one server of distributed server systems associated with an entity;
    onboard a machine learning model onto the at least one server to monitor execution of the at least one data process on the at least one server, wherein the machine learning model monitors execution of the at least one data process;
    communicate with a metrics node comprising a metrics machine learning model to gather information associated with the at least one server, wherein the metrics node monitors performance of the distributed server systems comprising the at least one server, via the metrics machine learning model, wherein the metrics node communicates with the machine learning model onboarded onto the at least one server to monitor execution of the at least one data process;
    determine that the at least one server will experience degradation of performance while performing at least one step of the at least one data process based on communicating with the metrics node;
    dynamically create the at least one new server based on determining that the at least one server will experience degradation of performance while performing the at least one step of the at least one data process by:
        identifying that a first server of the distributed server systems has processing capability to execute the at least one step associated with the at least one data process based on communicating with the metrics machine learning model of the metrics node;
        identifying one or more characteristics of the first server; and
        dynamically replicating the one or more characteristics of the first server to create the at least one new server to execute the at least one step of the at least one data process; and
    route the at least one step of the at least one data process to at least one new server and execute the at least one step on the at least one new server.

2. The system of claim 1, wherein the at least one processing device is configured to:
    determine that the at least one new server has completed execution of the at least one step; and
    terminate the at least one new server based on determining that the at least one new server has completed execution of the at least one step.

3. The system of claim 1, wherein the at least one processing device is configured to:
    determine that the at least one new server has completed execution of the at least one step;
    determine that at least one other step associated with at least one other data process scheduled to be executed on any server of the distributed server systems needs additional processing capability for successful execution, wherein the at least one other steps associated with the at least one other data process has same requirements as the at least one step associated with the at least one data process; and
    route the at least one other step associated with the at least one other data process to the at least one new server and execute the at least one other step on the at least one new server.

4. The system of claim 3, wherein the at least one processing device is configured to:
    determine that execution of the at least one other step on the at least one new server is complete;
    determine that no other tasks require processing capability of the at least one new server; and
    terminate the at least one new server.

5. The system of claim 1, wherein the at least one processing device is configured to:
    in response to executing the at least one step of the at least one data process in the at least one new server, resume execution of remaining steps associated with the at least one data process on the at least one server.

6. The system of claim 1, wherein initiation of execution of the at least one data process on the at least one server is performed by a user or an application.

7. The system of claim 1, wherein initiation of execution of the at least one data process on the at least one server is based on a schedule.

8. A computer program product for performing dynamic execution of data processes in distributed server systems, the computer program product comprising a non-transitory computer-readable storage medium having computer executable instructions for causing a computer processor to perform the steps of:
    identifying initiation of at least one data process that is scheduled to be executed on at least one server of distributed server systems associated with an entity;

onboarding a machine learning model onto the at least one server to monitor execution of the at least one data process on the at least one server, wherein the machine learning model monitors execution of the at least one data process;

communicating with a metrics node comprising a metrics machine learning model to gather information associated with the at least one server, wherein the metrics node monitors performance of the distributed server systems comprising the at least one server, via the metrics machine learning model, wherein the metrics node communicates with the machine learning model onboarded onto the at least one server to monitor execution of the at least one data process;

determining that the at least one server will experience degradation of performance while performing at least one step of the at least one data process based on communicating with the metrics node;

dynamically creating the at least one new server based on determining that the at least one server will experience degradation of performance while performing the at least one step of the at least one data process by:
identifying that a first server of the distributed server systems has processing capability to execute the at least one step associated with the at least one data process based on communicating with the metrics machine learning model of the metrics node;
identifying one or more characteristics of the first server; and
dynamically replicating the one or more characteristics of the first server to create the at least one new server to execute the at least one step of the at least one data process; and routing the at least one step of the at least one data process to at least one new server and execute the at least one step on the at least one new server.

9. The computer program product of claim 8, wherein the computer executable instructions for causing a computer processor to perform the steps of:
determining that the at least one new server has completed execution of the at least one step; and
terminating the at least one new server based on determining that the at least one new server has completed execution of the at least one step.

10. The computer program product of claim 8, wherein the computer executable instructions for causing a computer processor to perform the steps of:
determining that the at least one new server has completed execution of the at least one step;
determining that at least one other step associated with at least one other data process scheduled to be executed on any server of the distributed server systems needs additional processing capability for successful execution, wherein the at least one other steps associated with the at least one other data process has same requirements as the at least one step associated with the at least one data process; and
routing the at least one other step associated with the at least one other data process to the at least one new server and execute the at least one other step on the at least one new server.

11. The computer program product of claim 10, wherein the computer executable instructions for causing a computer processor to perform the steps of:
determining that execution of the at least one other step on the at least one new server is complete;
determining that no other tasks require processing capability of the at least one new server; and
terminating the at least one new server.

12. The computer program product of claim 8, wherein initiation of execution of the at least one data process on the at least one server is performed by a user or an application.

13. The computer program product of claim 8, wherein initiation of execution of the at least one data process on the at least one server is based on a schedule.

14. A computer implemented method for performing dynamic execution of data processes in distributed server systems, the method comprising:
identifying initiation of at least one data process that is scheduled to be executed on at least one server of distributed server systems associated with an entity;
onboarding a machine learning model onto the at least one server to monitor execution of the at least one data process on the at least one server, wherein the machine learning model monitors execution of the at least one data process;
communicating with a metrics node comprising a metrics machine learning model to gather information associated with the at least one server, wherein the metrics node monitors performance of the distributed server systems comprising the at least one server, via the metrics machine learning model, wherein the metrics node communicates with the machine learning model onboarded onto the at least one server to monitor execution of the at least one data process;
determining that the at least one server will experience degradation of performance while performing at least one step of the at least one data process based on communicating with the metrics node;
dynamically creating the at least one new server based on determining that the at least one server will experience degradation of performance while performing the at least one step of the at least one data process by:
identifying that a first server of the distributed server systems has processing capability to execute the at least one step associated with the at least one data process based on communicating with the metrics machine learning model of the metrics node;
identifying one or more characteristics of the first server; and
dynamically replicating the one or more characteristics of the first server to create the at least one new server to execute the at least one step of the at least one data process; and
routing the at least one step of the at least one data process to at least one new server and execute the at least one step on the at least one new server.

15. The computer implemented method of claim 14, wherein the method comprises:
determining that the at least one new server has completed execution of the at least one step; and
terminating the at least one new server based on determining that the at least one new server has completed execution of the at least one step.

16. The computer implemented method of claim 14, wherein the method further comprises:
determining that the at least one new server has completed execution of the at least one step;
determining that at least one other step associated with at least one other data process scheduled to be executed on any server of the distributed server systems needs additional processing capability for successful execution, wherein the at least one other steps associated with the at least one other data process has same requirements as the at least one step associated with the at least one data process; and routing the at least one other step associated with the at least one other data process to the at least one new server and execute the at least one other step on the at least one new server.

17. The computer implemented method of claim 16, wherein the method comprises:

determining that execution of the at least one other step on the at least one new server is complete;

determining that no other tasks require processing capability of the at least one new server; and terminating the at least one new server.

18. The computer implemented method of claim 14, wherein the method further comprises in response to executing the at least one step of the at least one data process in the at least one new server, resuming execution of remaining steps associated with the at least one data process on the at least one server.

19. The computer implemented method of claim 14, wherein initiation of execution of the at least one data process on the at least one server is performed by a user or an application.

20. The computer implemented method of claim 14, wherein initiation of execution of the at least one data process on the at least one server is based on a schedule.

\* \* \* \* \*